US011492932B2

United States Patent
Sheridan et al.

(10) Patent No.: US 11,492,932 B2
(45) Date of Patent: Nov. 8, 2022

(54) DEFLECTION LIMITER FOR A GAS TURBINE ENGINE

(71) Applicant: Raytheon Technologies Corporation, Farmington, CT (US)

(72) Inventors: William G. Sheridan, Southington, CT (US); Michael E. McCune, Colchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 117 days.

(21) Appl. No.: 16/992,727

(22) Filed: Aug. 13, 2020

(65) Prior Publication Data

US 2022/0049629 A1    Feb. 17, 2022

(51) Int. Cl.
F01D 25/34    (2006.01)
F01D 5/02     (2006.01)
(Continued)

(52) U.S. Cl.
CPC .............. F01D 25/34 (2013.01); F01D 5/02 (2013.01); F02C 7/32 (2013.01); F02C 7/36 (2013.01);
(Continued)

(58) Field of Classification Search
CPC .... F01D 25/34; F01D 5/02; F02C 7/32; F02C 7/36; F05D 2260/36; F05D 2260/40311;
(Continued)

(56) References Cited

U.S. PATENT DOCUMENTS 5,433,674 A * 7/1995 Sheridan .................. F01D 5/02
                                                    475/346
8,756,908 B2   6/2014 Sheridan et al.
(Continued)

FOREIGN PATENT DOCUMENTS

EP    3144498    3/2017
WO    9527860    10/1995

OTHER PUBLICATIONS

European Search Report for EP Application No. 21191397.5 dated Jan. 12, 2022.

Primary Examiner — Loren C Edwards
(74) Attorney, Agent, or Firm — Carlson, Gaskey & Olds, P.C.

(57) ABSTRACT

A gas turbine engine includes a turbine section that includes a fan drive turbine. A geared architecture includes a sun gear in driving engagement with the fan drive turbine. A plurality of planet gears surrounds the sun gear. A ring gear surrounds the plurality of planet gears. A deflection limiter mechanically attaches the ring gear to an engine static structure. The deflection limiter includes a first support fixed to the ring gear that has a first interlocking feature and a second support fixed to the engine static structure that has a second interlocking feature. The first and second interlocking features define at least one of a radial clearance of between 0.005 inches (0.127 mm) and 0.080 inches (2.032 mm) or a circumferential clearance of between 0.005 inches (0.127 mm) and 0.250 inches (2.032 mm). A fan section includes a plurality of fan blades in driving engagement with the geared architecture through a fan drive shaft.

15 Claims, 6 Drawing Sheets

(51) Int. Cl.
  *F02C 7/32* (2006.01)
  *F02C 7/36* (2006.01)
  *F16H 1/28* (2006.01)

(52) U.S. Cl.
  CPC ....... *F16H 1/2818* (2013.01); *F05D 2260/36* (2013.01); *F05D 2260/40311* (2013.01); *F05D 2260/43* (2013.01); *F05D 2260/53* (2013.01); *F05D 2300/70* (2013.01)

(58) Field of Classification Search
  CPC ............. F05D 2260/43; F05D 2260/53; F05D 2300/70; F16H 1/2818
  See application file for complete search history.

(56) References Cited

U.S. PATENT DOCUMENTS

| | | |
|---|---|---|
| 8,814,503 B2 | 8/2014 | McCune et al. |
| 8,974,344 B2 | 3/2015 | McCune et al. |
| 9,091,328 B2 | 7/2015 | Sheridan et al. |
| 9,739,170 B2 | 8/2017 | Ertas |
| 10,495,004 B2 | 12/2019 | Miller et al. |
| 2016/0298485 A1* | 10/2016 | Sheridan ................. F01D 17/06 |
| 2017/0082031 A1* | 3/2017 | Miller ...................... F02C 3/04 |
| 2017/0082065 A1 | 3/2017 | Swift |
| 2019/0203648 A1 | 7/2019 | Sheridan et al. |

\* cited by examiner

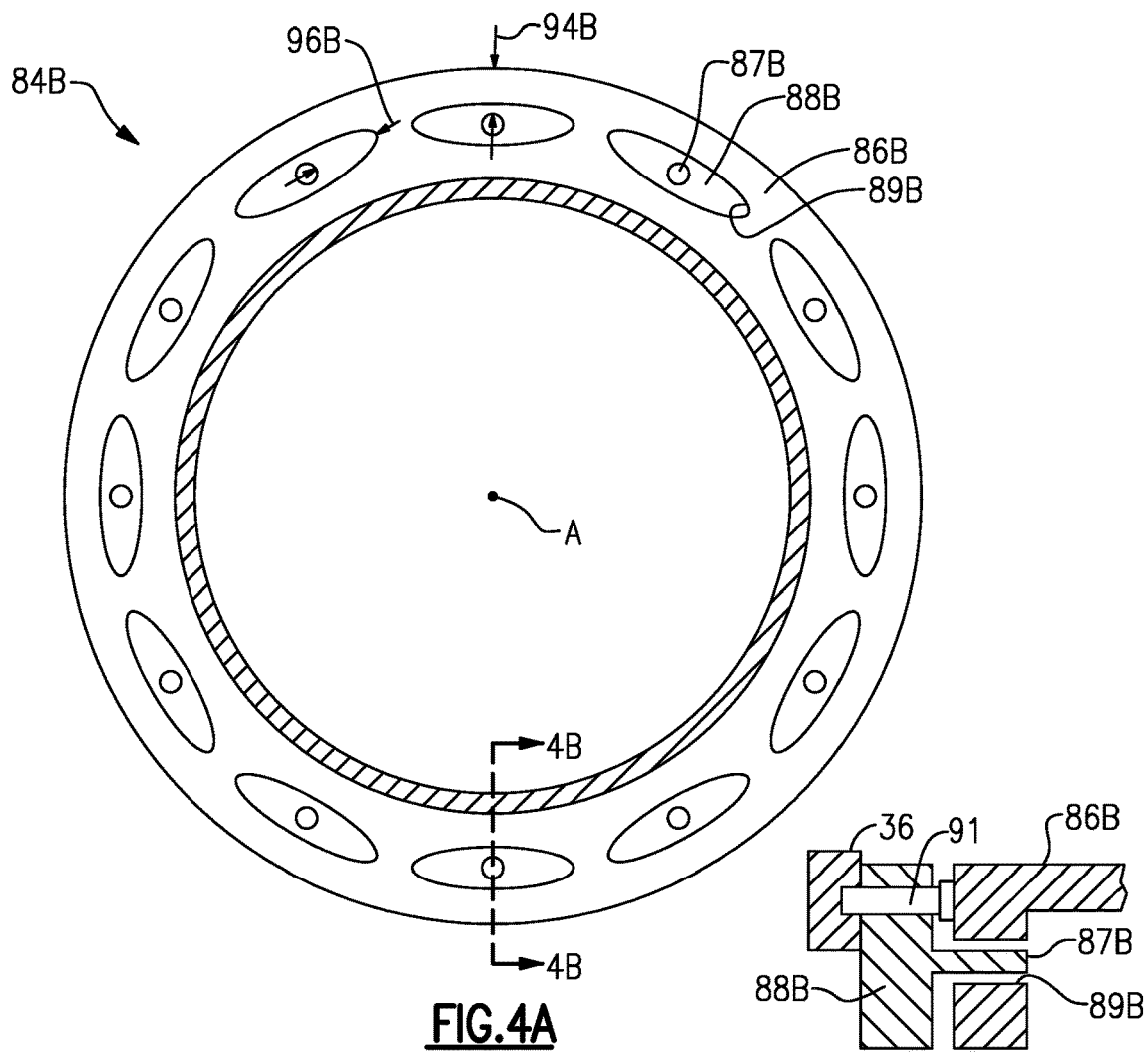
FIG.4A
FIG.4B
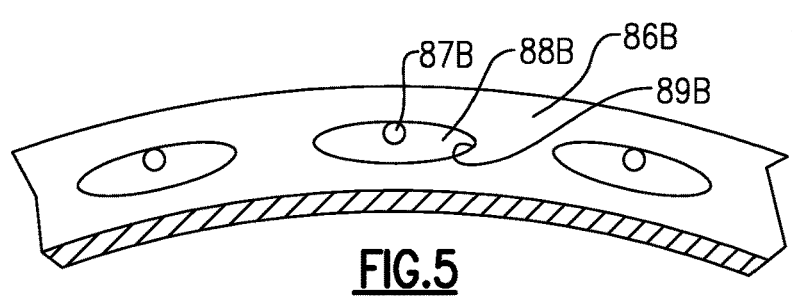
FIG.5
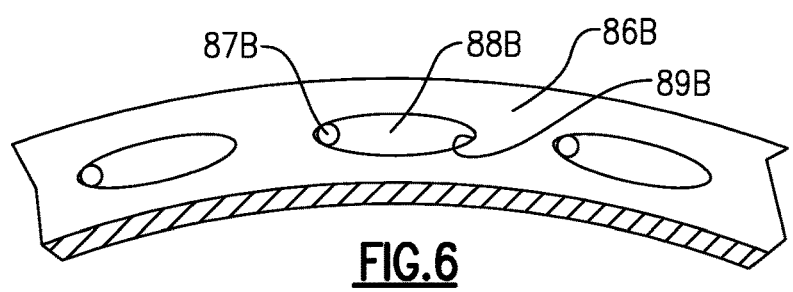
FIG.6

DEFLECTION LIMITER FOR A GAS TURBINE ENGINE

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

A gas turbine engine may include a geared architecture that drives a fan at a slower rotational speed than a fan drive turbine. The geared architecture is supported relative to an engine static structure using a support. The support is generally attached to one of a ring gear or a carrier in the geared architecture depending on the configuration of the geared architecture.

SUMMARY

In one exemplary embodiment, a gas turbine engine includes a turbine section that includes a fan drive turbine. A geared architecture includes a sun gear in driving engagement with the fan drive turbine. A plurality of planet gears surrounds the sun gear. A ring gear surrounds the plurality of planet gears. A deflection limiter mechanically attaches the ring gear to an engine static structure. The deflection limiter includes a first support fixed to the ring gear that has a first interlocking feature and a second support fixed to the engine static structure that has a second interlocking feature. The first and second interlocking features define at least one of a radial clearance of between 0.005 inches (0.127 mm) and 0.080 inches (2.032 mm) or a circumferential clearance of between 0.005 inches (0.127 mm) and 0.250 inches (2.032 mm). A fan section includes a plurality of fan blades in driving engagement with the geared architecture through a fan drive shaft.

In a further embodiment of any of the above, the radial clearance is between 0.030 inches (0.762 mm) and 0.050 inches (1.270 mm).

In a further embodiment of any of the above, the deflection limiter includes a maximum circumferential clearance that is greater than a maximum radial clearance.

In a further embodiment of any of the above, a ring gear flexible support supports the ring gear relative to the engine static structure.

In a further embodiment of any of the above, the fan drive turbine drives a low speed spool and the low speed spool is in driving engagement with the sun gear through a flexible input.

In a further embodiment of any of the above, the geared architecture is supported in a cantilever position with at least two fan drive shaft bearing systems supporting the fan drive shaft axially between the plurality of fan blades and the geared architecture.

In a further embodiment of any of the above, the radial clearance is between 0.030 inches (0.762 mm) up to 0.050 inches (1.270 mm) and the circumferential clearance is between 0.030 (0.762 mm) inches and 0.250 inches (6.350 mm).

In a further embodiment of any of the above, the geared architecture is located between a first fan drive shaft support bearing system located axially forward of the geared architecture. A second fan drive shaft support bearing system is located axially aft of the geared architecture.

In a further embodiment of any of the above, the radial clearance is between 0.030 inches (0.762 mm) up to 0.050 inches (1.270 mm).

In a further embodiment of any of the above, a flexible output shaft connects an output of the geared architecture and the fan drive shaft.

In a further embodiment of any of the above, the fan drive shaft is supported by at least two fan drive shaft bearing systems.

In a further embodiment of any of the above, the geared architecture is located between a first fan drive shaft support bearing system located axially forward of the geared architecture and a second fan drive shaft support bearing system located axially aft of the geared architecture.

In a further embodiment of any of the above, the radial clearance is between 0.030 inches (0.762 mm) up to 0.050 inches (1.270 mm).

In a further embodiment of any of the above, one of the first support and the second support include an aperture and the other of the first support and the second support include a projection located within a cavity at least partially defined by the aperture.

In a further embodiment of any of the above, the aperture is rectangular in cross section.

In a further embodiment of any of the above, the aperture is elliptical in cross section.

In a further embodiment of any of the above, a corresponding pair of the aperture and the projection are positioned every one to three inches circumferentially around an axis of rotation of the gas turbine engine.

In a further embodiment of any of the above, the gas turbine includes between 30 and 50 corresponding pairs of apertures and projections.

In another exemplary embodiment, a method of operating a gas turbine engine includes the step of driving a fan section through a geared architecture with a fan drive turbine. The geared architecture includes a plurality of planet gears in engagement with a sun gear and a ring gear. Movement of the ring gear is limited with deflection limiter in at least one of a radial direction of up to 0.080 inches (2.032 mm) or the circumferential direction of up to 0.0250 inches (6.350 mm).

In a further embodiment of any of the above, the deflection limiter allows for unequal amounts in movement between the radial direction and the circumferential direction.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 4A is a schematic view of another example deflection limiter.

FIG. 4B is a cross-sectional view taken along line 4B-4B of FIG. 4A.

FIG. 5 is a schematic view of the deflection limiter of FIG. 4A in a first position.

FIG. 6 is a schematic view of the deflection limiter of FIG. 4A in a second position.

DETAILED DESCRIPTION

Figure 1:
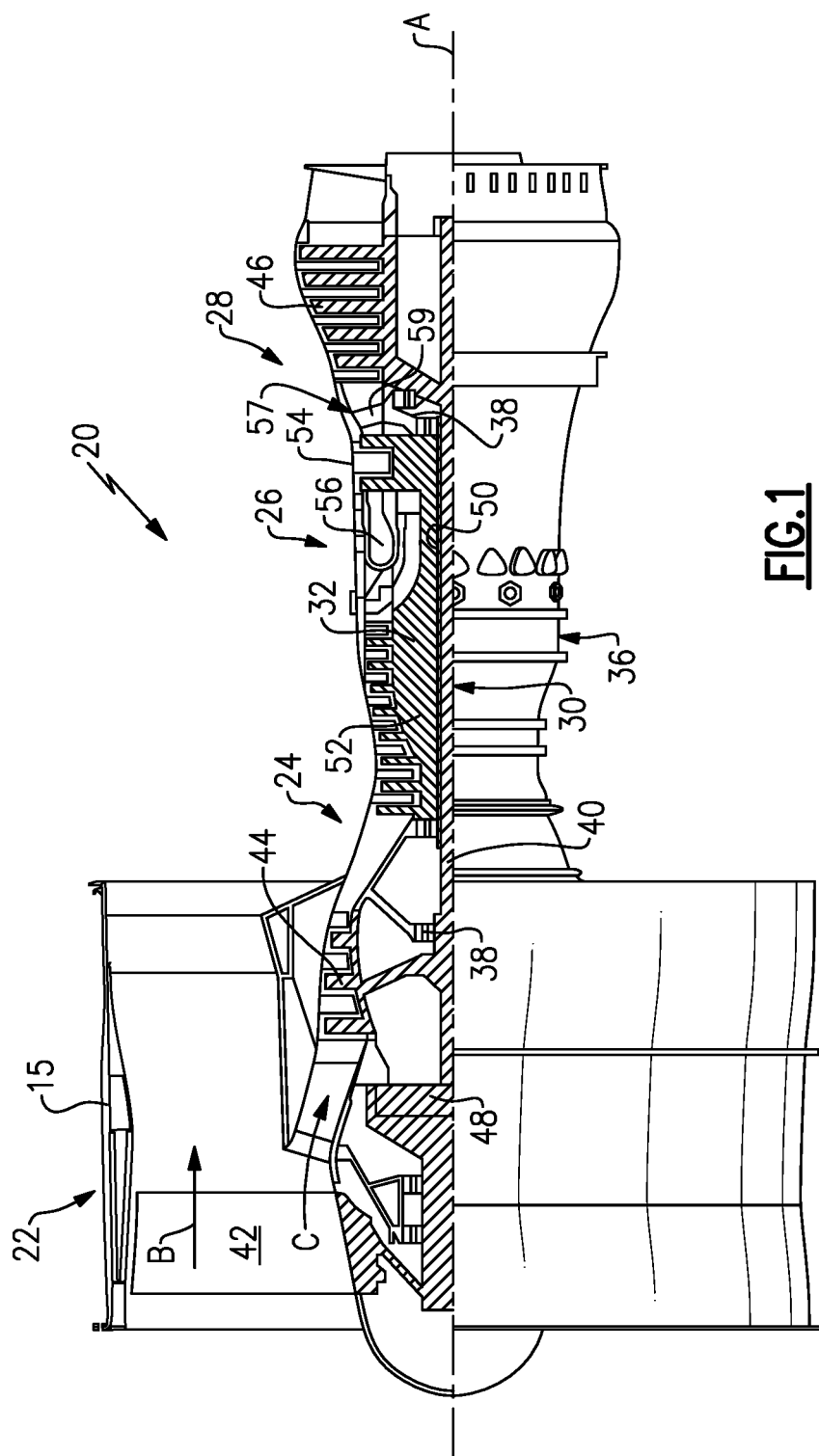
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15, such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
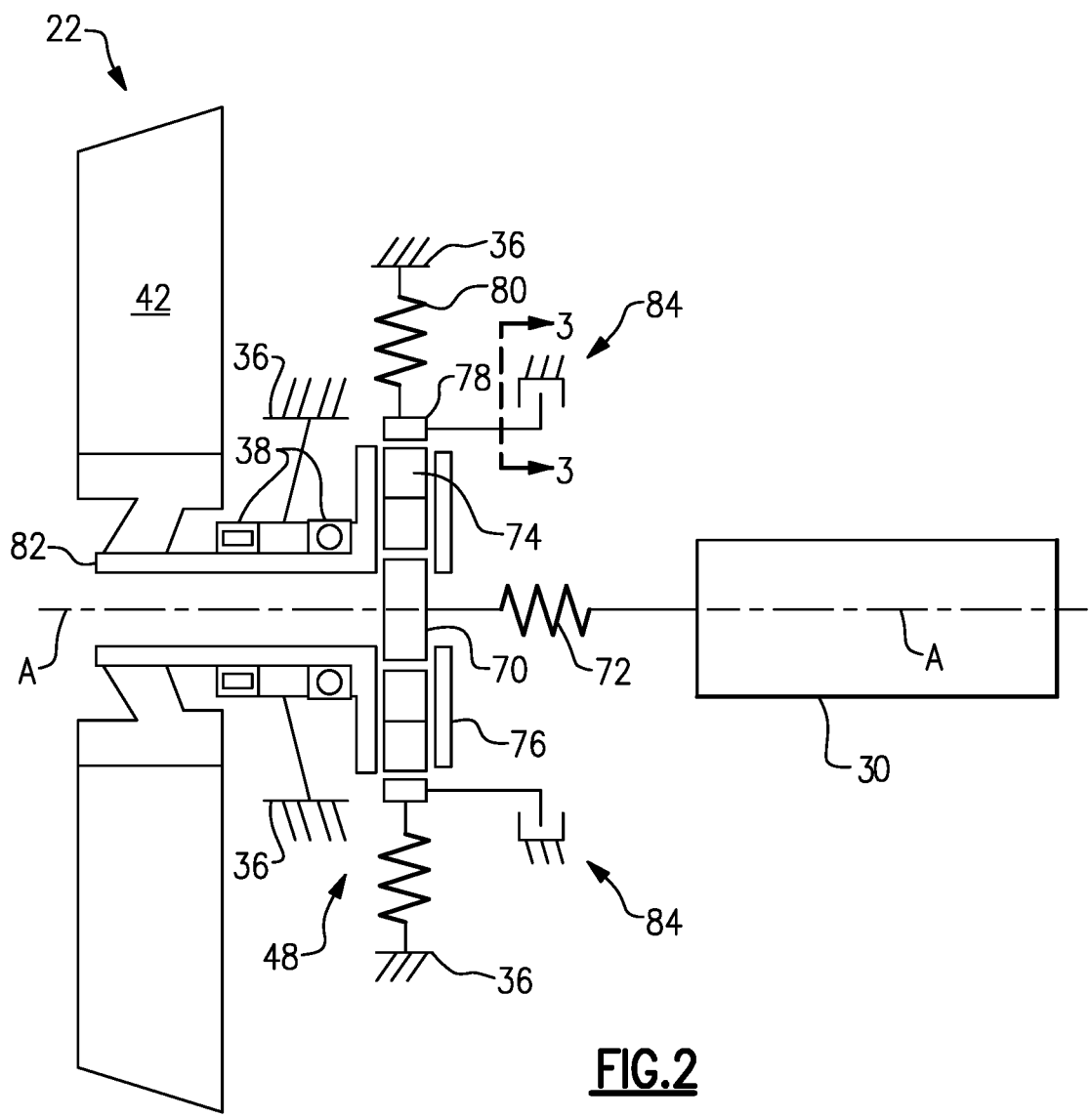
FIG. 2 is a schematic view of an example configuration of a geared architecture and a fan section.

FIG. 2 illustrates an example geared architecture 48 in driving engagement with the plurality of fan blades 42 in the fan section 22. The geared architecture 48 is driven by the low pressure turbine 46, or fan drive turbine, through the low speed spool 30. The low speed spool 30 is attached to a sun gear 70 of the geared architecture 48 through a flexible input coupling 72. The flexible input coupling 72 allows the low speed spool 30 to transfer rotational movement to the sun gear 70 while allowing a central longitudinal axis of the sun gear 70 to vary relative to a longitudinal axis of the low speed spool 30. The flexible input coupling 72 also segregates vibrations between the low speed spool 30 and the geared architecture 48.

The sun gear 70 is surrounded by multiple planet gears 74 that are supported by a carrier 76 with a central longitudinal axis of each of the planet gears 74 rotating around the engine axis A. A ring gear 78 is located on an opposite radial side of the planet gears 74 from the sun gear 70. In this disclosure, radial or radially, circumferential or circumferentially, and axial or axially is in relation to the engine axis A unless stated otherwise. The ring gear 78 is fixed from rotating relative to the engine static structure 36 through a flexible ring gear support 80. One feature of the flexible ring gear support 80 is the ability to maintain the ring gear 78 in alignment with the planet gears 74 and the sun gear 70 when loads are applied to the geared architecture 48 through a fan drive shaft 82 from the fan blades 42.

The loads from the fan blades 42 can cause the geared architecture 48 to pivot about a pair of bearings systems 38A and move the gears out of alignment because the geared architecture 48 is cantilevered relative to the pair of bearing systems 38A. In the illustrated example, the geared architecture 48 is connected to the fan drive shaft 82 through the carrier 76. The flexible support 80 allows the ring gear 78 to move in at least one of a radial direction or a circumferential direction to accommodate for movement from the fan drive shaft 82. The pair of bearing systems 38A each include an inner race that rotates with the fan drive shaft 82 and an outer race that is fixed relative to the engine static structure 36. Additionally, the flexible input coupling 72 and the flexible support 80 function together to maintain the gears of the geared architecture 48 in alignment during operation.

Because the ring gear 78 can move in at least one of a radial or a circumferential direction, a deflection limiter 84 is used in connection with the engine configuration of FIG. 2. The deflection limiter 84 provides a maximum radial or circumferential movement for the ring gear 78. The deflection limiter 84 used in connection with the configuration of FIG. 2 can include any of the deflection limiters 84A-D described below. Additionally, in the illustrated example, the deflection limiters 84A-D are fluid free deflection limiters and do not provide fluid damping of vibrations.

Figure 3:
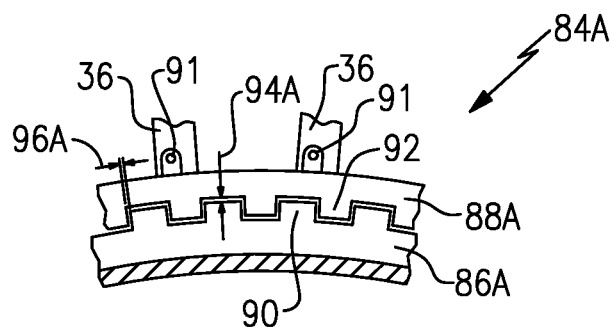
FIG. 3 is a cross-sectional view taken along line 3-3 of FIG. 2 schematically illustrating an example deflection limiter.

As shown in FIGS. 2 and 3, the deflection limiter 84A includes a first support 86A fixed or integral with the ring gear 78 and a second support 88A fixed to the engine static structure 36 to prevent the second support 88A from rotating relative to the engine static structure 36. The second support 88A can be secured with bolts 91 to the engine static structure 36 to serve as a mechanical ground. The first support 86A includes a first set of teeth 90A in an intermeshing relationship with a second set of teeth 92 on the second support 88A. The first set of teeth are located on an outer circumference of the first support 86A and the second set of teeth 92 are located on a radially inner circumference of the second support 88A.

The first and second set of teeth 90 and 92 include a radial clearance 94A defined between a distal end of one of the first or second teeth 90, 92 and a corresponding trough between adjacent teeth of the other of the first and second teeth 90, 92. Additionally, a circumferential clearance 96A is located between opposing circumferential sides of one of first teeth 90 and an adjacent one of the second teeth 92. In one example, the radial clearance 94A is from 0.005 inches (0.127 mm) up to 0.080 inches (2.032 mm) and in another example, the radial clearance 94A is from 0.030 inches (0.762 mm) up to 0.050 inches (1.270 mm). Furthermore, in one example, the circumferential clearance 96A is from 0.005 inches (0.127 mm) up to 0.250 inches (6.350 mm) and in another example, the circumferential clearance 96A is from 0.030 (0.762 mm) inches up to 0.250 inches (6.350 mm).

FIGS. 4A-6 illustrates another example deflection limiter 84B. The deflection limiter 84B is similar to the deflection limiter 84A except where described below or shown in the Figures. The deflection limiter 84B includes a first support 86A fixed or integral with the ring gear 78 and a second support 88B fixed relative to the engine static structure 36.

As shown in FIG. 4B, the second support 88A can be fixed to the engine static structure 36 with bolts 91.

The first support 86B includes a plurality of apertures 89B extend in a direction parallel of the engine axis A and accept a projection 87B fixed to the second support 88B. In another example, the apertures 89B could be located in the second support 89B and the projections 87B could be located on the first support 86B. A corresponding pair of apertures 89B and projections 87B are circumferentially spaced every one to three inches (2.54-7.62 cm) around the first and second supports 86B, 88B, respectively. Alternatively, there are between 3 and 50 or 30 and 50 corresponding pairs of apertures 89B and projections 87B circumferentially spaced around the first and second supports 86B, 88B, respectively.

In the illustrated example, the projections 87B are cylindrical and also extend in a direction parallel to the engine axis A. The projections 87B are configured to limit relative motion in the radial and circumferential directions between the first support 86B and the second support 88B. The limiting function of the projections 87B and the apertures 89B provide a maximum amount of deflection that the ring gear 78 can experience relative to the engine static structure 36 during operation. In the illustrated example, the projections 87B do not limit axial movement. Because the apertures 89B are elliptical in shape, the projections 87B are able travel further in a circumferential direction than in a radial direction relative to the axis A.

The apertures 89B and projections 87B provide the greatest radial clearance 94B in a single radial direction when there is not any circumferential deflection (See FIG. 5). Additionally, the greatest circumferential clearance 96B occurs when there is not any radial deflection (See FIG. 6). The curvilinear profile defined the edge of the aperture 89B provides a non-linear relationship between deflection limits in the radial and circumferential directions. One feature of the curvilinear profile is an ability to select a predetermined relationship between movement in the radial and circumferential directions.

Figure 7:
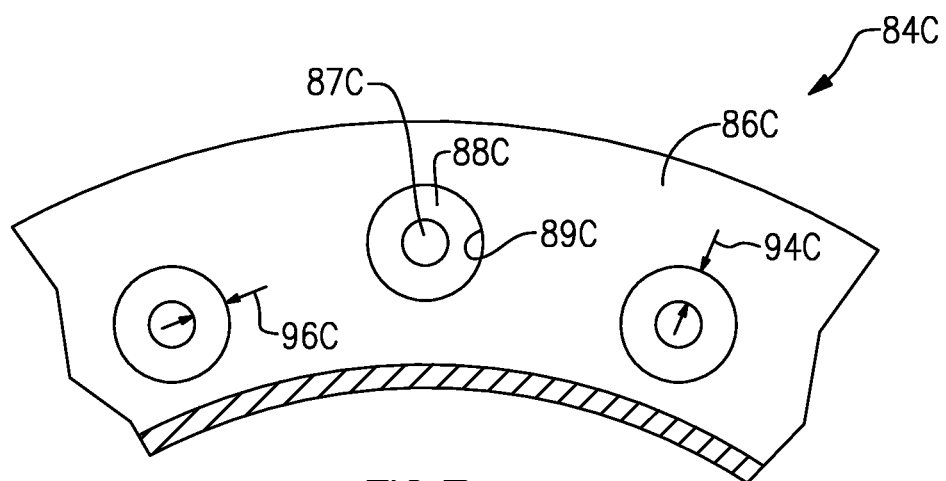
FIG. 7 is a schematic view of yet another example deflection limiter.

FIG. 7 illustrates another example deflection limiter 84C. The deflection limiter 84C is similar to the deflection limiters 84A-B except where described below or shown in the Figures. The deflection limiter 84C includes a first support 86C fixed or integral with the ring gear 78 and a second support 88C fixed relative to the engine static structure 36.

The first support 86C includes a plurality of apertures 89C that accept a projection 87C fixed to the second support 88C. In the illustrated example, the projections 87C are cylindrical and extend in a direction parallel to the engine axis A. The projections 87C are configured to limit relative motion in the radial and circumferential direction between the first support 86C and the second support 88C. Because the aperture 89C is cylindrical in shape, the projection 87C has a circumferential clearance 96C that is equal to a radial clearance 94C. Additionally, the curvilinear profile of the edge of the aperture 89C provides a non-linear relationship between deflection limits in the radial and circumferential directions.

Figure 8:
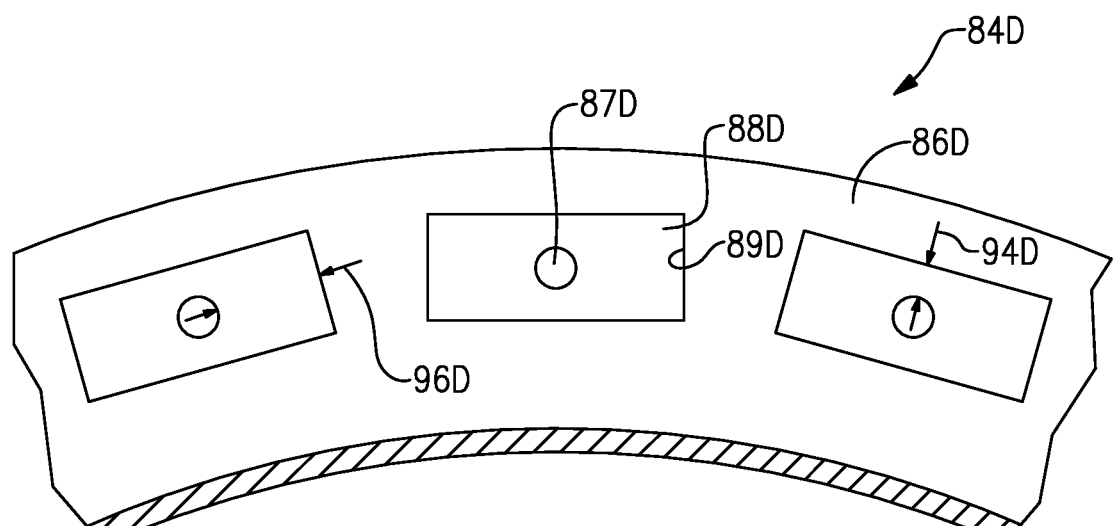
FIG. 8 is a schematic view of a further example deflection limiter.

FIG. 8 illustrates another example deflection limiter 84D. The deflection limiter 84D is similar to the deflection limiters 84A-C except where described below or shown in the Figures. The deflection limiter 84D includes a first support 86D fixed or integral with the ring gear 78 and a second support 88D fixed to the engine static structure 36.

The first support 86D includes a plurality of apertures 89D that accept a projection 87D fixed to the second support 88D. In the illustrated example, the projections 87D are cylindrical and extend in a direction parallel to the engine axis A. The projections 87D are configured to limit relative motion in the radial and circumferential direction between the first support 86D and the second support 88D. Because the aperture 89D defines a rectangular cross-sectional profile, the aperture 89D allows for maximum circumferential clearance 96D and radial clearance 94D at the same time. Furthermore, the aperture 89D can include a square cross-sectional profile instead of a rectangular cross-sectional profile to allow for maximum circumferential and radial clearance 96D, 94D at the same time.

Figure 9:
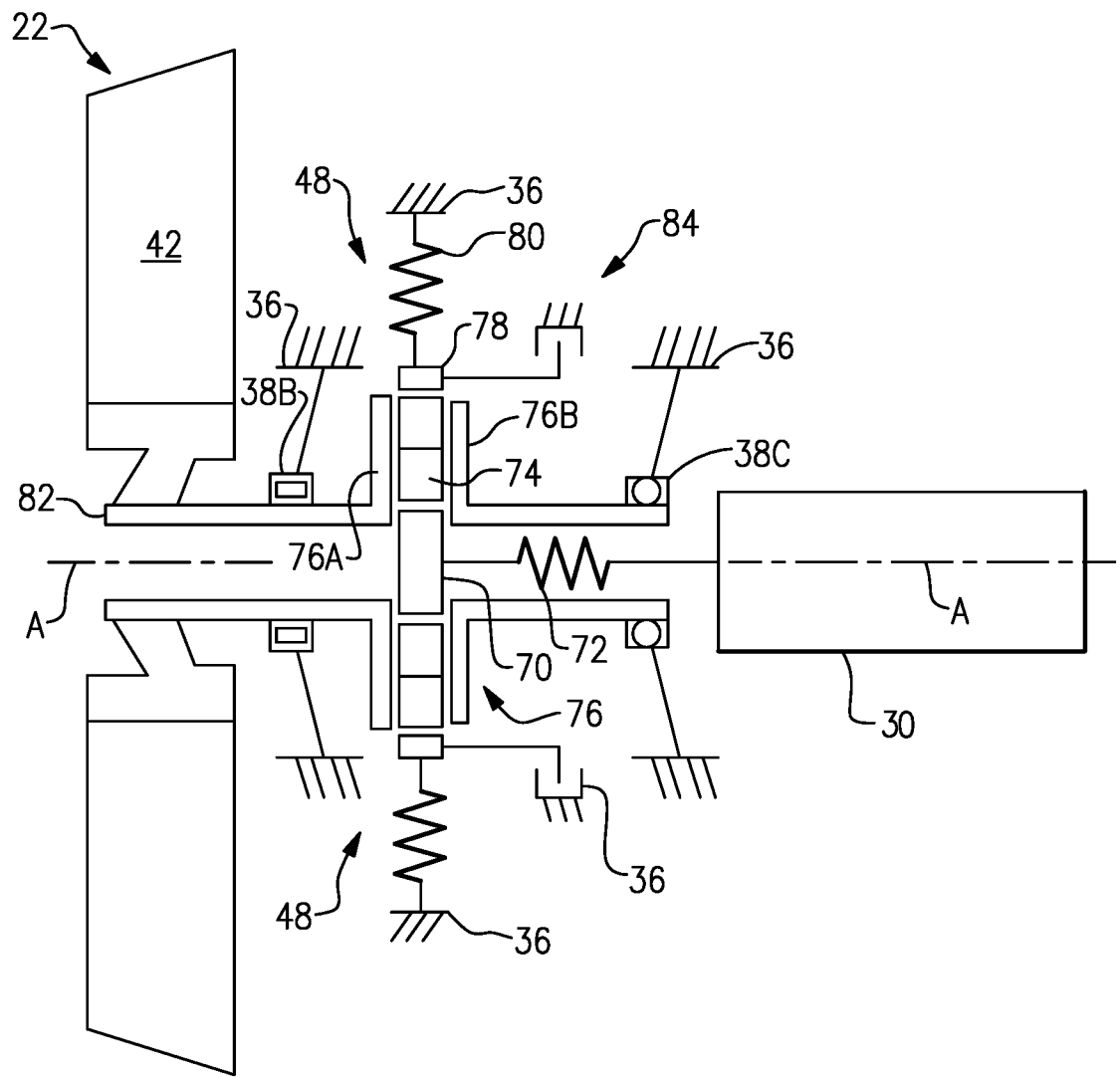
FIG. 9 is a schematic view of another example configuration of the geared architecture and the fan section.

FIG. 9 illustrates another configuration of the geared architecture 48 in driving engagement with the plurality of fan blades 42 in the fan section 22. The configuration of FIG. 9 is similar to the configuration of FIG. 2 except where described below or shown in the Figures. The geared architecture 48 is driven by the low pressure turbine 46 through the low speed spool 30. The low speed spool 30 is attached to the sun gear 70 of the geared architecture through the flexible input coupling 72.

The sun gear 70 is surrounded by multiple planet gears 74 that are supported by the carrier 76. The ring gear 78 is located on an opposite radial side of the planet gears 74 form the sun gear 70. The ring gear 78 is fixed from rotating relative to the engine static structure 36. In the illustrated example, the ring gear 78 is attached to the engine static structure 36 through the flexible support 80. The carrier 76 includes a forward carrier plate 76A and an aft carrier plate 76B that are each configured to rotate with the fan drive shaft 82.

To prevent unwanted movement of the geared architecture 48 resulting from movement of the fan drive shaft 82, a forward bearing system 38B is located forward of the geared architecture 48 and rotates with the forward carrier plate 76A and an aft bearing system 38C is located aft of the geared architecture 48 and rotates with the aft carrier plate 76B. In the illustrated example, an inner race of the forward bearing system 38B rotates with the fan drive shaft 82 and the forward carrier plate 76A and the outer race of the forward bearing system 38B is fixed from rotating relative to the engine static structure 36. Similarly, an inner race of the aft bearing system 38C rotates with the aft carrier plate 76B and the fan drive shaft 82 and an outer race of the aft bearing system 38C is fixed from rotating relative to the engine static structure 36.

Because the geared architecture 48 is surrounded axially or straddled by the forward and aft bearing systems 38B, 38C, the geared architecture 48 is less susceptible to movement in a radial direction as compared to the engine configuration of FIG. 2. Therefore, the deflection limiter 84 used in connection with the engine configuration of FIG. 8, is less concerned with limiting a magnitude of movement in the radial direction. The decreased concern regarding radial movement is because the forward and aft bearing systems 38B, 38C surrounding the geared architecture 48 limit radial loads through the fan drive shaft from other parts of the gas turbine engine 20. Therefore, a value for the radial clearance 94A-D is of less importance than a value for the circumferential clearance 96A-D because the configuration of the geared architecture 48 and fan section in FIG. 10 is less likely to move radially during operation.

Figure 10:
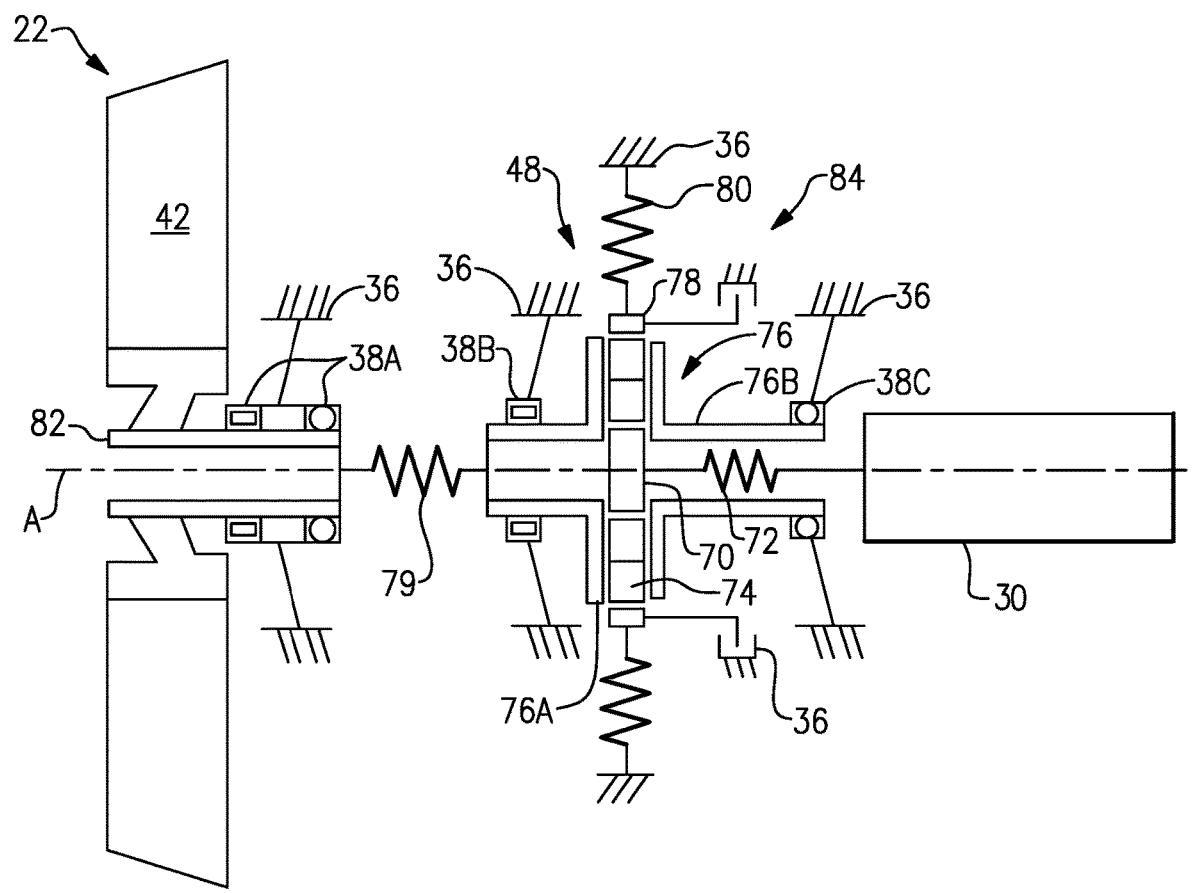
FIG. 10 is a schematic view of yet another example configuration of the geared architecture and the fan section.

FIG. 10 illustrates yet another configuration of the geared architecture 48 in driving engagement with the plurality of fan blades 42 in the fan section 22. The configuration of FIG. 10 is similar to the configuration of FIGS. 2 and 9 except where described below or shown in the Figures. The geared architecture 48 is driven by the low pressure turbine 46 through the low speed spool 30. The low speed spool 30 is attached to the sun gear 70 of the geared architecture through the flexible input coupling 72.

The sun gear 70 is surrounded by multiple planet gears 74 that are supported by the carrier 76. The ring gear 78 is located on an opposite radial side of the planet gears 74 from the sun gear 70. The ring gear 78 is fixed from rotating relative to the engine static structure 36. In the illustrated example, the ring gear 78 is attached to the engine static structure 36 through the flexible support 80. The forward carrier plate 76A and the aft carrier plate 76B of the carrier 76 are configured to rotate with the fan drive shaft 82.

To prevent unwanted movement of the geared architecture resulting from movement of the fan drive shaft 82, the forward bearing system 38B is located forward of the geared architecture 48 and rotates with the forward carrier plate 76A and the aft bearing system 38C is located aft of the geared architecture 48 and rotates with the aft carrier plate 76B. In the illustrated example, the inner race of the forward bearing system 38B rotates with the forward carrier plate 76A and the fan drive shaft 82 and the outer race of the bearing system 38B is fixed from rotating relative to the engine static structure 36. Similarly, the inner race of the aft bearing system 38C rotates with the aft carrier plate 76B and an outer race of the aft bearing system 38B is fixed from rotating relative to the engine static structure 36.

Furthermore, the fan drive shaft 82 is connected to the forward carrier plate 76A or output of the geared architecture 48 through a flexible output coupling 79 that transmits rotational movement between the fan drive shaft 82 and the output of the geared architecture 48. The flexible output coupling 79 reduces or eliminates the transfer of radial loads or vibrations to the geared architecture 48 that can lead to misalignment of the gears. The fan drive shaft 82 is supported by the pair of fan drive shaft support bearing systems 38A. Additionally, the bearing systems 38A-38C used in the configurations shown in FIGS. 2 and 9-10 are structural support bearings as opposed to oil transfer bearings that deliver oil to the geared architecture 48.

Because the geared architecture 48 in FIG. 10 is surrounded axially or straddled by the forward and aft bearing systems 38B, 38C, the geared architecture 48 is less susceptible to movement in a radial direction as compared to the engine configuration of FIG. 2. Therefore, the deflection limiter 84 used in connection with the engine configuration of FIG. 8, is less concerned with movement in the radial direction. Therefore, a value for the radial clearance 94A-D is of less importance than a value for the circumferential clearance 96A-D because the geared architecture 48 in FIG. 10 is less likely to move radially.

Although the different non-limiting examples are illustrated as having specific components, the examples of this disclosure are not limited to those particular combinations. It is possible to use some of the components or features from any of the non-limiting examples in combination with features or components from any of the other non-limiting examples.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A gas turbine engine comprising:
   a turbine section including a fan drive turbine;
   a geared architecture including:
      a sun gear in driving engagement with the fan drive turbine, wherein the fan drive turbine drives a low speed spool and the low speed spool is in driving engagement with the sun gear through a flexible input;
      a plurality of planet gears surrounding the sun gear; and
      a ring gear surrounding the plurality of planet gears;
   a deflection limiter mechanically attaching the ring gear to an engine static structure, wherein the deflection limiter includes a first support fixed to the ring gear and a second support fixed to the engine static structure wherein one of the first support and the second support include an aperture elliptical in cross section and the other of the first support and the second support include a projection located within a cavity at least partially defined by the aperture with the first support and the second support defining at least one of a radial clearance of between 0.005 inches (0.127 mm) and 0.080 inches (2.032 mm) or a circumferential clearance of between 0.005 inches (0.127 mm) and 0.250 inches (2.032 mm);
   a ring gear flexible support supporting the ring gear relative to the engine static structure; and
   a fan section including a plurality of fan blades in driving engagement with the geared architecture through a fan drive shaft.

2. The gas turbine engine of claim 1, wherein the radial clearance is between 0.030 inches (0.762 mm) and 0.050 inches (1.270 mm).

3. The gas turbine engine of claim 1, wherein the deflection limiter includes a maximum circumferential clearance that is greater than a maximum radial clearance.

4. The gas turbine engine of claim 1, wherein the geared architecture is supported in a cantilever position with at least two fan drive shaft bearing systems supporting the fan drive shaft axially between the plurality of fan blades and the geared architecture.

5. The gas turbine engine of claim 4, wherein the radial clearance is between 0.030 inches (0.762 mm) and 0.050 inches (1.270 mm) and the circumferential clearance is between 0.030 (0.762 mm) inches and 0.250 inches (6.350 mm).

6. The gas turbine engine of claim 1, wherein the geared architecture is located between a first fan drive shaft support bearing system located axially forward of the geared architecture and a second fan drive shaft support bearing system located axially aft of the geared architecture.

7. The gas turbine engine of claim 6, wherein the radial clearance is between 0.030 inches (0.762 mm) and 0.050 inches (1.270 mm).

8. The gas turbine engine of claim 1, wherein a flexible output shaft connects an output of the geared architecture and the fan drive shaft.

9. The gas turbine engine of claim 8, wherein the fan drive shaft is supported by at least two fan drive shaft bearing systems.

10. The gas turbine engine of claim 9, wherein the geared architecture is located between a first fan drive shaft support bearing system located axially forward of the geared architecture and a second fan drive shaft support bearing system located axially aft of the geared architecture.

11. The gas turbine engine of claim 8, wherein the radial clearance is between 0.030 inches (0.762 mm) and 0.050 inches (1.270 mm).

12. The gas turbine engine of claim 1, wherein a corresponding pair of the aperture and the projection are positioned every one to three inches circumferentially around an axis of rotation of the gas turbine engine.

13. The gas turbine engine of claim 1, further comprising between 30 and 50 corresponding pairs of the apertures and the projection.

14. A gas turbine engine comprising:
   a turbine section including a fan drive turbine;
   a geared architecture including:
      a sun gear in driving engagement with the fan drive turbine, wherein the fan drive turbine drives a low speed spool and the low speed spool is in driving engagement with the sun gear through a flexible input;
      a plurality of planet gears surrounding the sun gear; and
      a ring gear surrounding the plurality of planet gears;
   a deflection limiter mechanically attaching the ring gear to an engine static structure, wherein the deflection limiter includes a first support fixed to the ring gear and a second support fixed to the engine static structure wherein one of the first support and the second support include an aperture and the other of the first support and the second support include a projection located within a cavity at least partially defined by the aperture with the first support and the second support defining at least one of a radial clearance of between 0.005 inches (0.127 mm) and 0.080 inches (2.032 mm) or a circumferential clearance of between 0.005 inches (0.127 mm) and 0.250 inches (2.032 mm) and a corresponding pair of the aperture and the projection are positioned every one to three inches circumferentially around an axis of rotation of the gas turbine engine;
   a ring gear flexible support supporting the ring gear relative to the engine static structure; and
   a fan section including a plurality of fan blades in driving engagement with the geared architecture through a fan drive shaft.

15. A gas turbine engine comprising:
   a turbine section including a fan drive turbine;
   a geared architecture including:
      a sun gear in driving engagement with the fan drive turbine, wherein the fan drive turbine drives a low speed spool and the low speed spool is in driving engagement with the sun gear through a flexible input;
      a plurality of planet gears surrounding the sun gear; and
      a ring gear surrounding the plurality of planet gears;
   a deflection limiter mechanically attaching the ring gear to an engine static structure, wherein the deflection limiter includes a first support fixed to the ring gear and a second support fixed to the engine static structure wherein one of the first support and the second support include an aperture and the other of the first support and the second support include a projection located within a cavity at least partially defined by the aperture with the first support and the second support defining at least one of a radial clearance of between 0.005 inches (0.127 mm) and 0.080 inches (2.032 mm) or a circumferential clearance of between 0.005 inches (0.127 mm) and 0.250 inches (2.032 mm) and including between 30 and 50 corresponding pairs of the apertures and the projection;

a ring gear flexible support supporting the ring gear relative to the engine static structure; and a fan section including a plurality of fan blades in driving engagement with the geared architecture through a fan drive shaft.

\* \* \* \* \*